May 1, 1934.    R. C. WILLIAMS    1,956,846
BOLT LOCK
Filed May 29, 1933
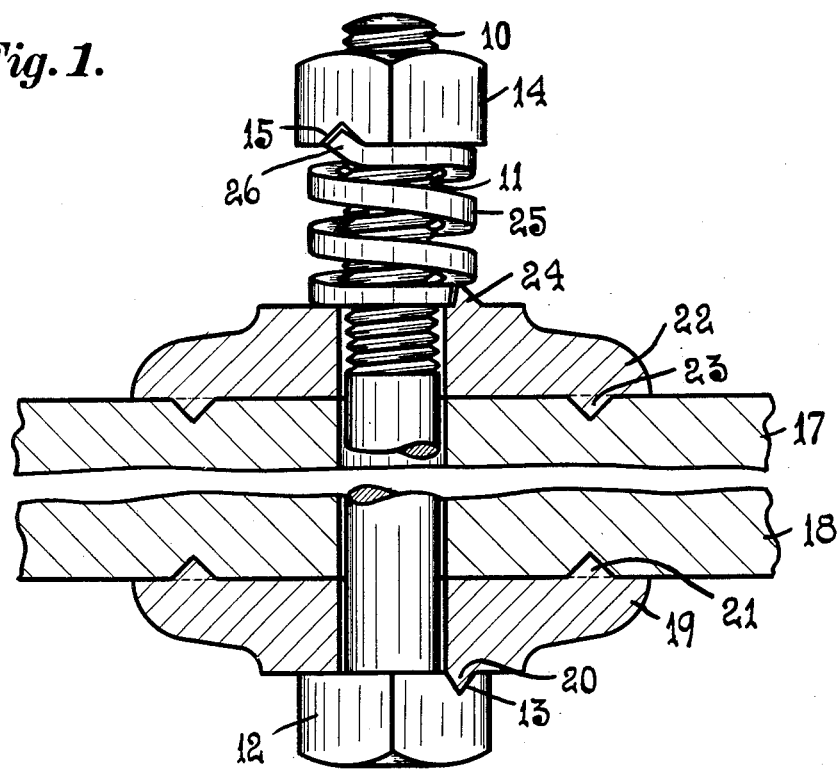
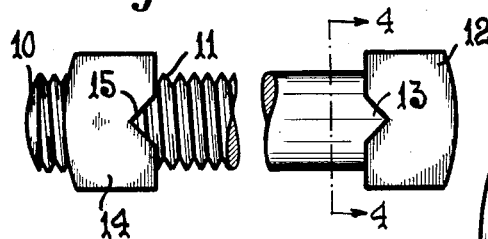
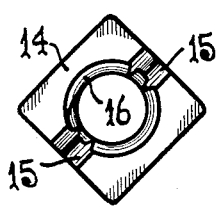
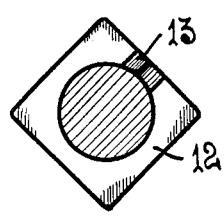
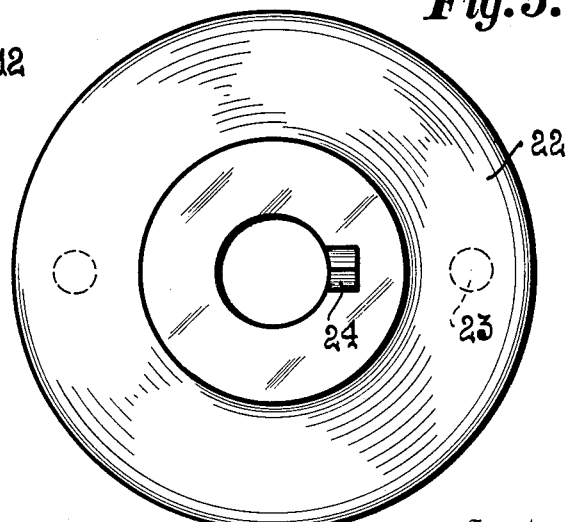
Inventor
R.C.Williams
By Arthur H. Sturges
Attorney Patented May 1, 1934

1,956,846

UNITED STATES PATENT OFFICE 1,956,846

BOLT LOCK

Richard C. Williams, Council Bluffs, Iowa

Application May 29, 1933, Serial No. 673,327

1 Claim. (Cl. 151—41)

This invention relates primarily to vibratable bridge structures and more particularly to a joining assembly therefor and has for an object the provision of a construction for preventing the disassembly of the parts thereof incident to vibration and the like such as is caused by the contraction and expansion of metals, and the shrinking and swelling of wooden bridge timbers incident to exposure to the weather.

Another object of the invention is to provide a joining assembly the parts of which may be readily disassembled, the manufacture, construction and operation thereof to be economical.

A still further object of the invention is to provide a joining assembly particularly adapted for use in connection with railway bridge structures whereby safety in the use of the latter is augmented.

Other and further objects and advantages of the invention will be understood from the following detailed description, reference being had to the accompanying drawing, wherein:

Figure 1 is a side elevation partly in section of a joining assembly embodying the present invention.

Figure 2 is a side view of a special bolt and nut employed.

Figure 3 is a plan view of the nut.

Figure 4 is a transverse sectional view of the bolt taken substantially along the dotted line 4—4 of Figure 2.

Figure 5 is a top plan view of a special washer employed.

Referring now to the drawing for a more particular description, 10 indicates a bolt provided intermediate its ends with threads 11 and a head 12, the latter having a slot 13 as shown in Figures 2 and 4. The bolt is provided with a nut 14 having a kerf 15 as best shown in Figure 3. The nut is provided with interior annular threads 16 adapted to co-operatively engage with the threads 11 formed on the shank of the bolt 10.

A pair of oppositely disposed washers are employed which are adapted to be interchangeably used with respect to each other. The flat surfaces of the washers which are of greater area than the exposed surfaces are each provided with a means for gripping and locking with the oppositely disposed wooden bridge timbers 17 and 18 positioned between the washers.

It will be understood that in use the timbers 17 and 18 have a normal initial position with respect to each other provided by a later described spring and are shown spaced apart in Figure 1 for convenience of illustration.

A bolt head detent washer 19 is provided with a detent lug 20 in engagement with the slot 13 of the bolt-head as shown in Figure 1 whereby the bolt is prevented from turning movements with respect to the washer 19 and the latter is provided with a pointed boss 21 engaged with the timber 18 for preventing turning movements of the washer and bolt with respect to the timber, the bolt being disposed through the timbers and the apertured washers.

A washer 22 is engaged with the bridge timber 17 and prevented from having turning movements with respect to the said timber by means of its pointed boss 23 in engagement therewith, the washer 22 being provided with a lug 24 for an engagement with an end of a compressible spring 25 and preventing turning movements of the spring.

The nut 14 is rotatably disposed on the threads of the bolt 10 at a comparatively remote distance from the washer 22 and the compressible spring 25 is positioned between the washer 24 and the nut 14.

Preferably the spring 25 is of helical type and provided with an outwardly turned end 26 normally engaged with the kerf 15 of the nut, the other end of the spring abutting against or operatively engaged with the spring detent lug 24 of the washer 22.

It is well known in the art that vibration incident to the use of bridges ultimately loosens the bolts and nuts which join the parts of bridge assembly structures together whereby the same must be tightened at intermittent intervals with an attendant expense to augment a safe assembly, especially in railroad bridge constructions. In the practice of the present invention the parts of the assembly are arranged as shown in Figure 1 and it will be understood that the nut 14 may be rotated for compressing the spring 25 to any desired extent for urging the timbers toward each other. At the end of the operation the up-turned end of the spring is engaged with the kerf 15 normally preventing a reverse movement of the nut, the spring being prevented from rotation by means of its engagement with its detent lug 24 of the washer 22, the latter being prevented from turning movements by its pointed boss engaged with or embedded in the bridge timber 17, the bolt being prevented from rotation by means of its slot operatively engaged with the detent lug 20 of the washer 19 and the latter being prevented from rotation by means of its boss 21 gripping the timber 18.

It will be understood that the wooden bridge timbers 17 and 18 may respectively be a wooden girder and a wooden railway tie carrying rails or the like or adjunct parts of a bridge structure necessitating that the initial installation of the assembly of the present invention be made with care as later explained. It is known that bridge timbers swell and become larger in size incident to absorbing moisture and contract or shrink to smaller sizes incident to exposure to heat generated by the sun, said changes in size of the timbers due to exposure to changing weather conditions occurring at intermittent intervals has heretofore caused the conventional nuts and bolts of bridge structures to become loosened whereby vibration imparted thereto by passing trains has caused the bolts and nuts to have relative turning movements on the threads of each other co-operating to permit a disturbance of the initial position of the timbers and weakening the structure and in many instances the loss of bolts and nuts rendering the structure dangerous in instances where constant manual bolt and nut tightening operations are not practiced.

The springs 25 are adapted to resist a pressure of approximately 4000 pounds for use in connection with girders and ties positioned transversely thereon and may have more or less resistance in accordance with their use in connection with other parts of a bridge structure.

During installation in new or old bridge structures the springs 25 must be compressed initially by the nut 14 sufficient to provide the timbers 17 and 18 with a normal selected position or a contact with respect to each other and between the washers which position is approximately automatically maintained by the spring which is arranged to yield for increasing the distance between the washers or lessen said distance should the timbers swell or shrink and at the same time provide resiliency for cushioning the shock imparted to the timbers incident to a train passing over said rails, it being well known that resiliency in a railway road-bed is a desideratum. The degree to which the spring should be compressed for consumating the said purposes depends upon the location and function of each timber as assembled in the whole bridge structure and may be regulated by the distance permitted initially between the nut 14 and the washer 22 for urging the timbers toward each other and maintaining the desired normal position therebetween in order that when vibratory movements are imparted to the assembly the bolt and nut are prevented from having relative turning movements on the threads of each other co-operating to lessen the urge of the spring. In assembling the device of the invention care must be taken to insure sufficient tension applied by the spring for drawing the head of the bolt against the washer 19 and a seating of the lug 13 of the latter within the slot of the bolt also insuring that an end of the spring is against the washer 22 for engagement against the lug 24 thereof so that the nut is prevented from being rotated off from the bolt and the latter is prevented from rotating out of the nut and insuring that the bolt co-operates with the nut for maintaining the distance initially selected between the nut and head of the bolt constant in order that the urge of the spring is not decreased for providing the said normal working position between the timbers at all times. It will be noted that the area of the flat surfaces of the washers in contact with the timbers are comparatively large for spreading the stress applied to a timber by a washer incident to a train passing over the bridge structure in lieu of becoming worked into or countersunk into the timbers as would obtain if the washers were of a small contacting surface whereby the initial adjustment of the tension of the spring could become detrimentally altered.

In order to readily take the assembly apart a screw driver or the like media may be inserted under the nut 14 and between it and the spring and the latter manually compressed; whereupon the nut may be removed from the bolt and the assembly taken apart.

It will be noted at the engagement between the head of the bolt and its underlying washer will be maintained by means of co-operation of the lug with the washer positioned in the slot of the bolt head.

From the foregoing description it is thought to be obvious that a joining assembly constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish it to be understood as limiting myself to the precise arrangement and formation of the several parts herein shown in carrying out my invention in practice except as claimed.

I claim:—

A joining assembly for a vibratable bridge structure having in combination, a pair of oppositely disposed washers each provided with a lug and a boss, wooden bridge timbers having a normal initial position with respect to each other positioned between the washers and in locking engagement with the bosses of the latter for preventing turning movements of each washer with respect to the timber locked thereto, a threaded bolt disposed through the timbers and washers, said bolt having a slotted head engaged against a washer with the lug of the engaged washer in register with the slot of the bolt for preventing turning movements of the bolt, a threaded nut on the threads of the bolt and provided with a kerf, and a compressed spring about the bolt positioned between the nut and the washer oppositely disposed to the washer engaged by the head of the bolt for maintaining the engagement of said bolt head slot with the lug of its underlying washer, said spring engaged with the kerf of the nut and the lug of said oppositely disposed washer for preventing turning movements of the nut on the bolt, whereby upon vibratory movements being imparted to the assembly the bolt and nut are prevented from having relative turning movements on the threads of each other co-operating to lessen the urge of the spring and the normal initial position of the timbers.

RICHARD C. WILLIAMS.